(No Model.)
J. A. SMITH.
BICYCLE TIRE.
No. 601,048. Patented Mar. 22, 1898.
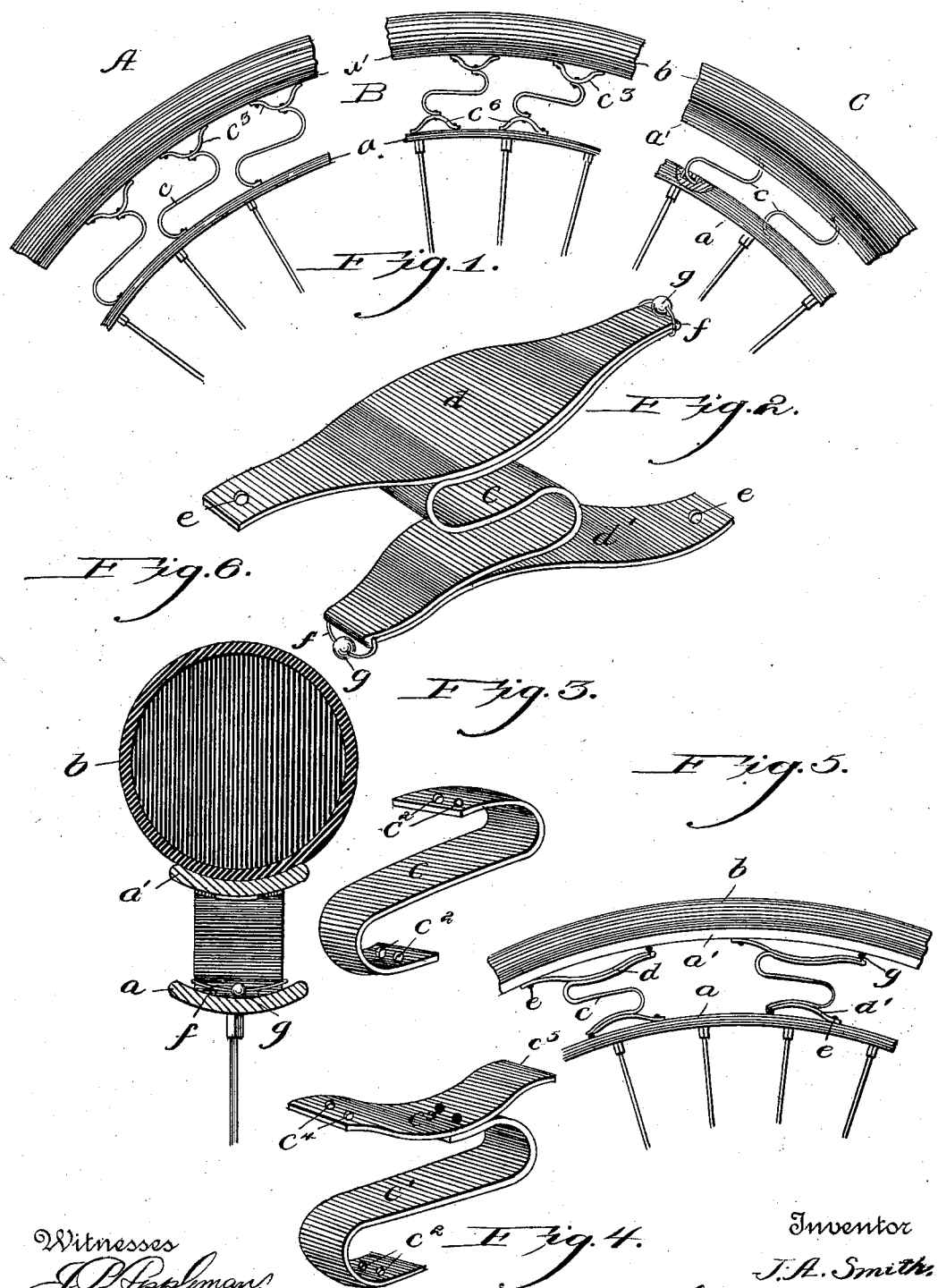

UNITED STATES PATENT OFFICE.

JOHN A. SMITH, OF PITTSBURG, PENNSYLVANIA.

BICYCLE-TIRE.

SPECIFICATION forming part of Letters Patent No. 601,048, dated March 22, 1898.

Application filed September 27, 1897. Serial No. 653,123. (No model.)

*To all whom it may concern:*

Be it known that I, JOHN A. SMITH, a citizen of the United States of America, residing at Pittsburg, in the county of Allegheny and State of Pennsylvania, have invented certain new and useful Improvements in Bicycle-Tires, of which the following is a specification, reference being had therein to the accompanying drawings.

This invention relates to certain new and useful improvements in bicycle-tires, and has for its object to construct and employ in conjunction with the ordinary india-rubber tire, either solid, cushion, or pneumatic, a series of springs arranged around the outer periphery of the rim upon which the rubber tire is supported, these springs being adapted to sustain and compensate the weight of the vehicle and attain a greater resiliency from the tire than is obtained when the same is employed without the springs.

The invention further aims to attain as great a resiliency by the aid of these springs when employed in conjunction with a solid or cushion tire as is obtained with the pneumatic tire, and thereby obviating the dangers of punctures incident to the employment of the pneumatic tire.

The invention further aims to provide means for the movement of the springs, caused by the compressing and relaxing of the same, in order that no undue strain may be placed upon the same when under compression and during their relaxation.

The invention further aims to construct a tire of this nature that will be extremely simple in its construction, strong, durable, effective in its operation, and comparatively inexpensive to manufacture.

With the above and other objects in view the invention finally consists in the novel construction, combination, and arrangement of parts to be hereinafter more specifically described, and particularly pointed out in the claim.

In describing the invention in detail reference is had to the accompanying drawings, forming a part of this specification, and wherein like letters of reference indicate similar parts throughout the several views, in which—

Figure 1 is a side elevation of a portion of a bicycle-wheel, showing three different forms of springs, the principle involved and result obtained being the same. Fig. 2 is a perspective view of one form of spring. Fig. 3 is a similar view of another form. Fig. 4 is a similar view of another form. Fig. 5 is a side view of a portion of a wheel equipped with the form of spring shown in Fig. 2. Fig. 6 is a cross-sectional view of a portion of the wheel constructed in accordance with my invention.

Referring now to the drawings by means of reference-letters, $a$ indicates the rim of the wheel, which may be of the ordinary form of construction, and in lieu of the tire $b$ being attached to this rim directly the same is supported by means of a series of springs attached to the rim $a$ and to an auxiliary rim $a'$, to which the tire $b$ is fastened, said latter rim being of any desired style to accommodate the clencher, hose-pipe, or other form of tire employed.

In Fig. 2 I have shown one form of a spring which is constructed of a flat piece of suitable metal bent upon itself to a point at or about its center, where the strip is again bent, thus forming the spring portion $c$, said strip being again bent upon itself to form the upper plate $d$, which engages the auxiliary rim $a'$ of the lower plate $d'$, engaging the main rim $a$ of the wheel. These plates $d$ and $d'$ are curved slightly, so as to conform to the cylindrical shape of the rims, and at the two free ends of the same they are provided with apertures $e$ for fastening the same to the respective rims, and in the loops formed at the free ends by bending the material upon itself is secured a wire ring $f$, which carries ball $g$, adapted to operate against the respective rims and permit the easy motion of the spring while being compressed. The position of this spring when attached to the wheel is illustrated in Fig. 5 of the drawings. In Fig. 3 I have shown another form of spring in which the same principle is involved, and the application of the same is shown in that portion of the view lettered C in Fig. 1 of the drawings. This form of spring, which is indicated by the reference-letter $c'$, is provided near each of its ends with apertures $c^2$ for securing to the respective rims, and in order to add to the strength of the same the ends may be embedded in the respective rims, as is shown in part C of Fig. 1. This same form of spring is shown in Fig. 4, with the addition of a curved spring $c^3$ being attached to its upper end and provided in one of its ends with apertures $c^4$ for attaching to the rim $a'$, the end $c^5$ thereof being free to operate against the rim $a'$ when the spring is being compressed, this application being shown in that part of Fig. 1 designated A.

In the part B of Fig. 1 I have shown the same form of spring heretofore described employed with both the upper spring $c^3$ and a similar spring $c^6$, attached to the other end and to the rim $a$ and operating on the said rim $a$ in the same manner in which the spring $c^3$ operates on the rim $a'$.

By this arrangement of a spring-controlled tire the same advantages may be attained when a solid or cushioned tire is employed as is attained through the use of the ordinary pneumatic tire, inasmuch as they are extremely yielding and productive of smooth motion, while they do not participate in the inconveniences of pneumatic tires, which when in the least damaged remain inoperative unless constantly refilled with air.

In Fig. 6 of the drawings I have shown the springs used in conjunction with the pneumatic tire, which may be employed where a large amount of resiliency is to be attained.

It will be noted that various changes may be made in the details of construction without departing from the general spirit of my invention.

Having fully described my invention, what I claim as new, and desire to secure by Letters Patent, is—

In a bicycle the combination of a main rim, an auxiliary rim surrounding the same, a series of springs interposed between said main rim and the auxiliary rim, each of said springs consisting of two curved pieces $d$ and $d'$, a spring portion $c$ formed between said plates, the ends of said piece of metal being adapted to be secured to the main and auxiliary rim respectively, a ring secured at the free ends of the spring and carrying a ball whereby the friction against the main and auxiliary rim is reduced while the spring is being compressed, substantially as shown and described.

In testimony whereof I affix my signature in presence of two witnesses.

JOHN A. SMITH.

Witnesses:
  JOHN NOLAND,
  THOS. M. BOYD, Jr.